United States Patent
Roh et al.

(10) Patent No.: US 8,872,931 B2
(45) Date of Patent: Oct. 28, 2014

(54) CAMERA MODULE FOR REDUCING SHUTTER DELAY, CAMERA INCLUDING THE SAME, AND METHOD OF DRIVING THE SAME

(75) Inventors: Jong Ho Roh, Yongin-si (KR); Sun Hee Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 317 days.

(21) Appl. No.: 12/910,052

(22) Filed: Oct. 22, 2010

(65) Prior Publication Data

US 2011/0109766 A1 May 12, 2011

(30) Foreign Application Priority Data

Nov. 10, 2009 (KR) ........................ 10-2009-0107865

(51) Int. Cl.
*H04N 5/228* (2006.01)
*H04N 5/232* (2006.01)

(52) U.S. Cl.
CPC ..................................... *H04N 5/232* (2013.01)
USPC ........................................................ 348/222.1

(58) Field of Classification Search
USPC ........... 348/220.1, 222.1, 223.1, 239, 333.01, 348/333.05, 333.11, 333.12
See application file for complete search history.

(56) References Cited

U.S. PATENT DOCUMENTS

| | | | |
|---|---|---|---|
| 5,471,577 A * | 11/1995 | Lightbody et al. | 715/837 |
| 6,683,642 B1 * | 1/2004 | Kobayashi et al. | 348/231.2 |
| 7,710,488 B2 * | 5/2010 | Wang | 348/333.05 |
| 2005/0057667 A1 * | 3/2005 | Shimizu et al. | 348/231.99 |
| 2007/0188506 A1 * | 8/2007 | Hollevoet et al. | 345/530 |
| 2008/0316331 A1 * | 12/2008 | Jun | 348/222.1 |
| 2009/0015701 A1 * | 1/2009 | Noh | 348/311 |

* cited by examiner

*Primary Examiner* — Lin Ye
*Assistant Examiner* — Chriss Yoder, III
(74) *Attorney, Agent, or Firm* — F. Chau & Associates, LLC

(57) ABSTRACT

A camera module includes an image sensor configured to convert an optical signal received through a lens into an electrical signal and generate full-size image data, an image signal processing unit configured to calibrate and output the full-size image data, a first memory unit configured to periodically receive and store the full-size image data from the image signal processing unit, a scaling unit configured to scale down the full-size image data received from the first memory unit and periodically output scaled-down image data to a display device, and an encoder configured to receive the full-size image data stored in the first memory unit, convert it into a compressed file in a predetermined format, and output the compressed file upon opening of a shutter.

15 Claims, 7 Drawing Sheets

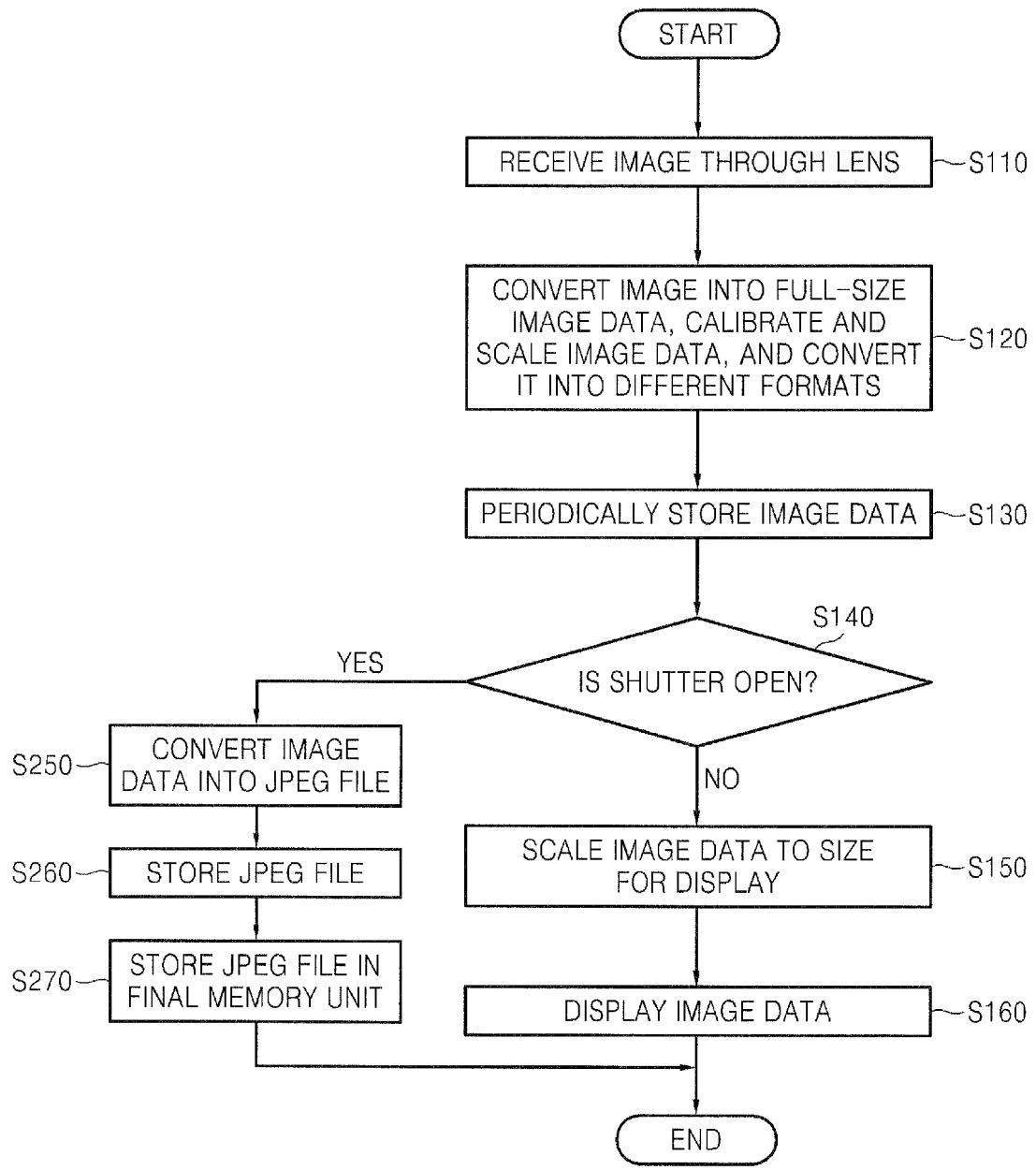

CAMERA MODULE FOR REDUCING SHUTTER DELAY, CAMERA INCLUDING THE SAME, AND METHOD OF DRIVING THE SAME

CROSS-REFERENCE TO RELATED APPLICATIONS

This application claims the benefit of Korean Patent Application No. 10-2009-0107865, filed on Nov. 10, 2009, in the Korean Intellectual Property Office, the disclosure of which is incorporated herein in its entirety by reference.

BACKGROUND

The present inventive concept relates to a camera module for reducing a camera shutter delay, a camera including the same, and a method of driving the same, and more particularly, to a camera module for reducing a camera shutter delay by storing a preview image, a camera including the same, and a method of driving the same.

In the field of portable terminals and mobile devices, higher-performance camera functions are in strong demand. Conventionally, portable terminal cameras or other cameras show a preview image to a user and store the preview image when the user presses a shutter button. An image is stored at a lower resolution in a conventional preview mode using sub-sampling than in a still image mode. When a user presses a shutter button, a full-size image is output and captured in the still image mode. Accordingly, the time it takes for the full-size image to be captured and stored from the time the shutter button is pressed is referred to as "shutter delay".

SUMMARY

Some embodiments of the present inventive concept provide a camera module for reducing a camera shutter delay, an electronic device including the same, and a method of driving the same.

According to some embodiments of the present inventive concept, there is provided a camera module including an image sensor configured to convert an optical signal received through a lens into an electrical signal and generate full-size image data, an image signal processing unit configured to calibrate and output the full-size image data, a first memory unit configured to periodically receive and store the full-size image data from the image signal processing unit, a scaling unit configured to scale down the full-size image data received from the first memory unit and periodically output scaled-down image data to a display device, and an encoder configured to receive the full-size image data stored in the first memory unit, convert it into a compressed file in a predetermined format, and output the compressed file upon opening of a shutter.

The camera module may also include a controller configured to sense the opening of the shutter and control the first memory device not to store the full-size image data upon the opening of the shutter.

The camera module may further include a second memory unit configured to store the compressed file output from the encoder.

The image signal processing unit may include an image signal processor configured to set exposure conditions for the full-size image data, set autofocus, and/or adjust white balance, and an image calibrator configured to calibrate color shade and picture quality of the full-size image data.

The image signal processing unit may further include a format converter configured to convert a format of full-size image data output from the image calibrator into a predetermined format.

The format converter may convert the full-size image data output from the image calibrator into first format full-size image data corresponding to the display device and into second format full-size image data corresponding to the encoder.

The first memory unit may include a first buffer configured to buffer the first format full-size image data to the display device and a second buffer configured to buffer the second format full-size image data to the encoder.

The encoder may convert the second format full-size image data output from the second buffer into the compressed file in the predetermined format and output the compressed file upon the opening of the shutter.

The format converter may convert the full-size image data output from the image calibrator into RGB format full-size image data corresponding to the display device and into YCbCr format full-size image data corresponding to the encoder and output the RGB format full-size image data and the YCbCr format full-size image data to the first memory unit.

The encoder may convert the YCbCr format full-size image data output from the first memory unit into a Joint Photographic Experts Group (JPEG) file and output the JPEG file upon the opening of the shutter.

According to other embodiments of the present inventive concept, there is provided a method of driving a camera module. The method includes the operations of converting an optical signal received through a lens into an electrical signal to generate full-size image data, calibrating the full-size image data; periodically storing the calibrated full-size image data, scaling down the stored full-size image data and periodically outputting scaled-down image data to a display device, and converting the stored full-size image data into a compressed file in a predetermined format and outputting the compressed file upon opening of a shutter.

The method may also include sensing the opening of the shutter and controlling the full-size image data not to be stored upon the opening of the shutter.

The method may further include storing the compressed file.

The operation of calibrating the full-size image data may include calibrating color shade and picture quality of the full-size image data.

The operation of calibrating the full-size image data may include converting a format of the full-size image data into a predetermined format.

The converting the format of the full-size image data may include converting the full-size image data into a first format corresponding to the display device and into a second format corresponding to an encoder.

The operation of periodically storing the calibrated full-size image data may include buffering the full-size image data in the first format to the display device and buffering the full-size image data in the second format to the encoder.

The first format may be an RGB format and the second format may be a YCbCr format.

The operation of converting the stored full-size image data into the compressed file and outputting the compressed file upon the opening of the shutter may include converting the full-size image data in the YCbCr format into a Joint Photographic Experts Group (JPEG) file and outputting the JPEG file upon the opening of the shutter.

BRIEF DESCRIPTION OF THE DRAWINGS

The above and other features and advantages of the present inventive concept will become more apparent by describing in detail exemplary embodiments thereof with reference to the attached drawings in which:

FIG. 7 is a flowchart of a method of driving a camera including a camera module according to some embodiments of the present inventive concept.

DETAILED DESCRIPTION OF THE EMBODIMENTS

Figure 1:
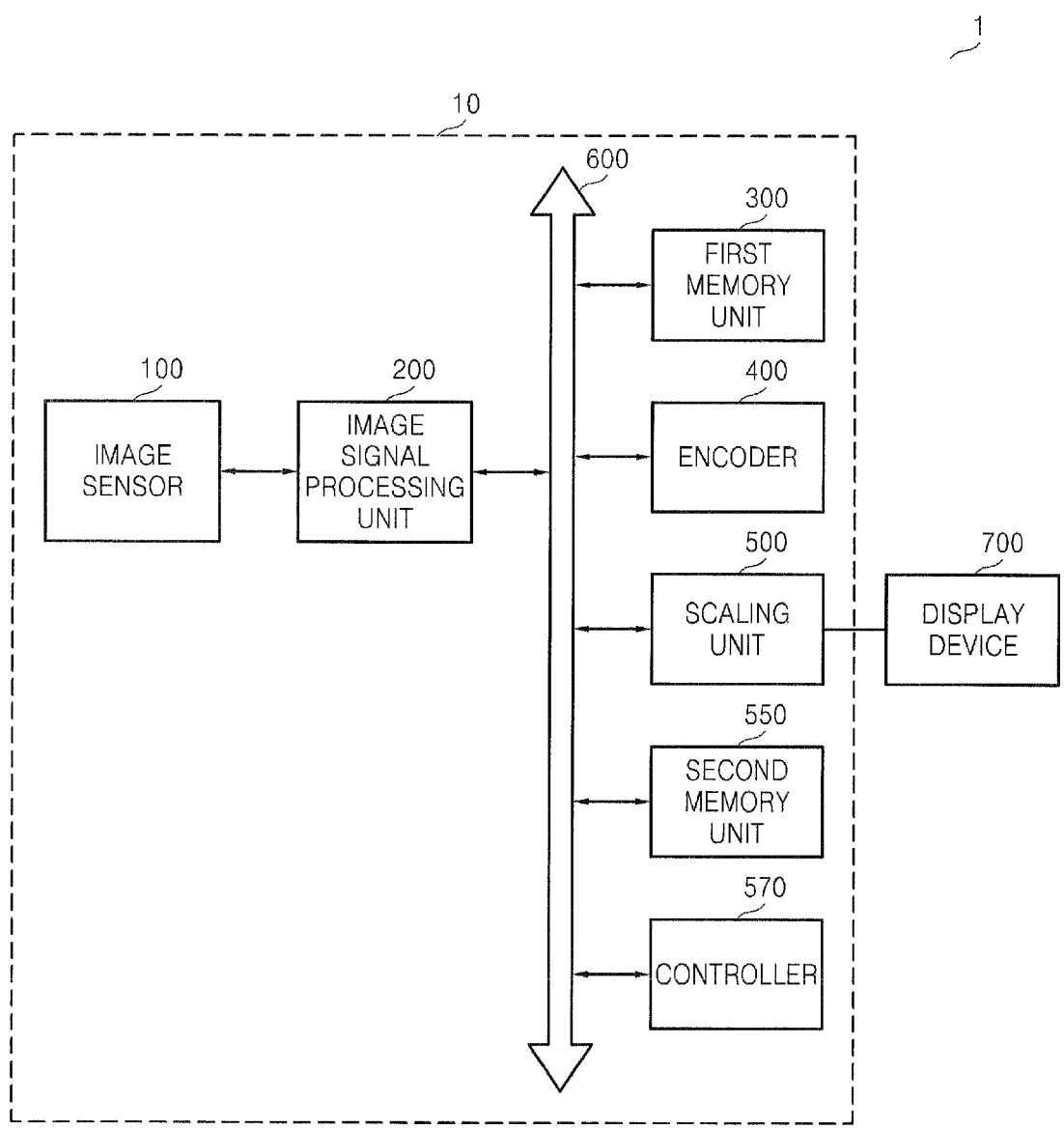
FIG. 1 is a diagram showing a camera module according to some embodiments of the present inventive concept.

The present inventive concept now will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a diagram showing a camera module 10 according to some embodiments of the present inventive concept. The camera module 10 includes an image sensor 100, an image signal processing unit 200, a first memory unit 300, an encoder 400, a scaling unit 500, a second memory unit 550, a controller 570, and a system bus 600.

The image sensor 100 converts an optical signal received through a lens into an electrical signal and generates full-size image data. At this time, the full size is an actual pixel size.

The image signal processing unit 200 calibrates the full-size image data output from the image sensor 100. For instance, the image signal processing unit 200 performs shake compensation or color calibration on the image data and adjusts the white balance of the image data. At this time, digital image stabilization (DIS), electrical image stabilization (EIS), or optical image stabilization (OIS) may be used for the shake compensation.

The first memory unit 300 periodically receives the image data from the image signal processing unit 200 via the system bus 600 and stores it. The first memory unit 300 may store the image data in various formats. For instance, the first memory unit 300 may store the image data in a CMYK, HSV, CIE or YUV (i.e., YPbPr in analog transmission and YCbCr in digital transmission) format. The first memory unit 300 will be described below in detail with reference to FIG. 3.

The encoder 400 may receive the image data stored in the first memory unit 300 via the system bus 600 upon opening of a shutter, for example, when a user presses down the shutter, and convert the image data into a compressed file in a predetermined format. However, the present inventive concept is not restricted to the current embodiments. For instance, the encoder 400 may convert a YCbCr format stored in the first memory unit 300 into a Joint Photographic Experts Group (JPEG) file.

The scaling unit 500 receives an image from the first memory unit 300 via the system bus 600 and scales the image. At this time, the scaling unit 500 may adjust the size of the image to be suitably output to a display device 700 connected thereto.

The second memory unit 550 stores the JPEG file from the encoder 400 upon the opening of the shutter. At this time, the second memory unit 550 may transmit the JPEG file to a separate memory via a first interface (not shown). Although the second memory unit 550 is included within the camera module 10 in the embodiments illustrated in FIG. 1, the present inventive concept is not restricted to the current embodiments. The second memory unit 550 may be implemented as a separate storage device, e.g., an external NAND flash memory.

The controller 570 senses the opening of the shutter and controls image data (e.g., YCbCr format data) stored in the first memory unit 300 to be output to the encoder 400 upon the opening of the shutter. At this time, the controller 570 may be provided inside or outside the camera module 10 and may be implemented by a general-purpose input/output (GPIO) port or an analog-to-digital convertor (ADC), but the present inventive concept is not restricted to the current embodiments.

In addition, the controller 570 may control image data in different formats to be simultaneously stored in the first memory unit 300. The controller 570 may also control image data not to be stored in the first memory unit 300 upon the opening of the shutter. For instance, the controller 570 may control image data in the YCbCr format not to be stored in the first memory unit 300 upon the opening of the shutter, but the present inventive concept is not restricted thereto.

The camera module 10 may be used in portable cameras, digital single-lens reflex (DSLR) cameras, and single-lens reflex (SLR) cameras.

Figure 2:
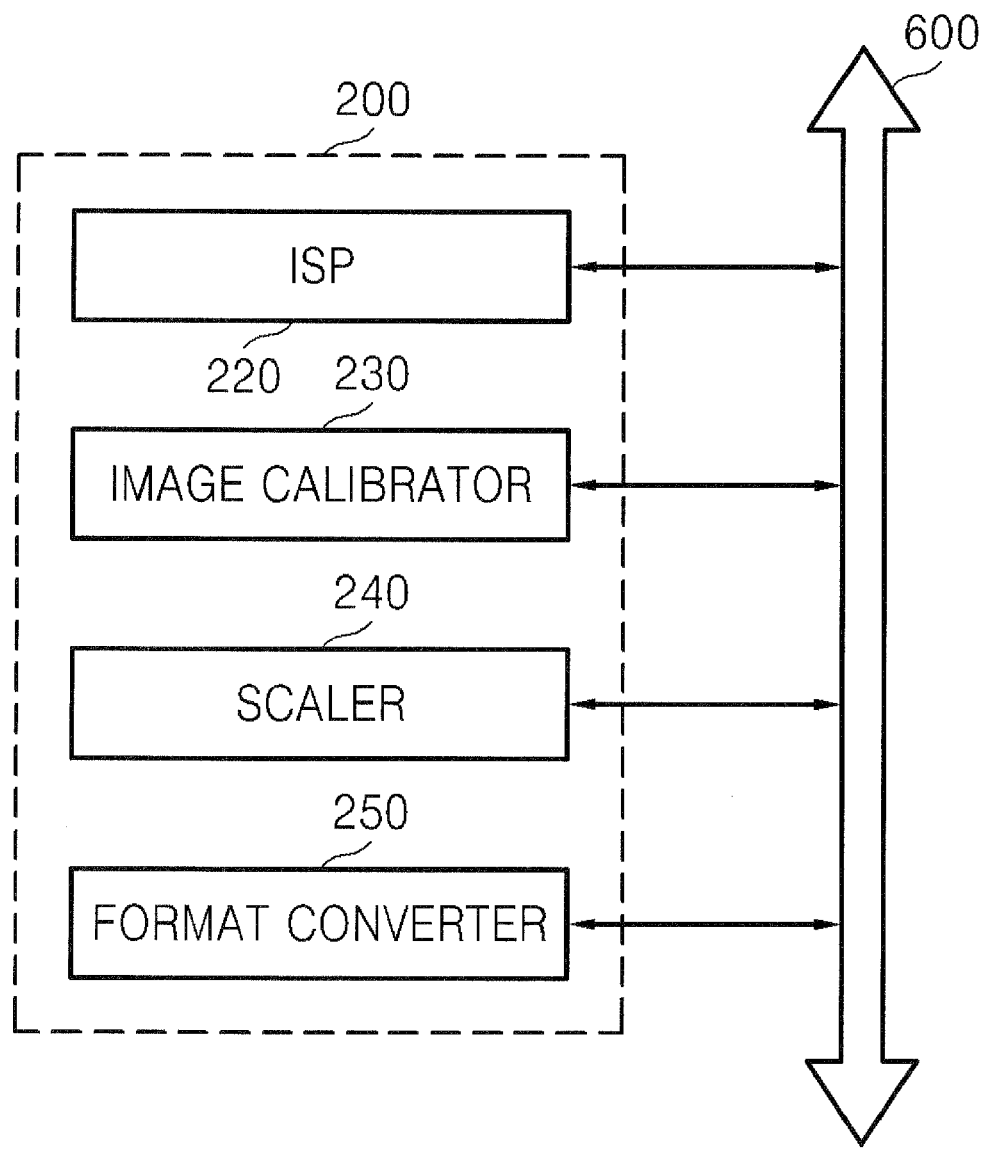
FIG. 2 is a detailed diagram showing an image signal processing unit illustrated in FIG. 1.

FIG. 2 is a detailed diagram showing the image signal processing unit 200 illustrated in FIG. 1. Referring to FIG. 2, the image signal processing unit 200 includes an image signal processor (ISP) 220, an image calibrator 230, a scaler 240, and a format converter 250.

The ISP 220 processes image data received from the image sensor 100. Although the ISP 220 is provided inside the image signal processing unit 200 in FIG. 2, the present inventive concept is not restricted thereto. For instance, the ISP 220 may be provided outside the image signal processing unit 200 or may be integrated into the image sensor 100. The ISP 220 will be described below in detail with reference to FIG. 3.

The image calibrator 230 calibrates color or picture quality of the image data received via the system bus 600. Although not shown, the image calibrator 230 may include a color reproduction processor calibrating the image data to predetermined color shade, a picture quality processor calibrating the quality of picture, and a calculator calculating color shade information and picture quality information.

The scaler 240 receives the calibrated image data via the system bus 600 and scales the calibrated image data so that the image data is stored in the first memory unit 300.

The format converter 250 converts the scaled image data into different formats. For instance, the format converter 250 may convert the scaled image data into an RGB, CMYK, HSV, CIE or YUV format.

Figure 3:
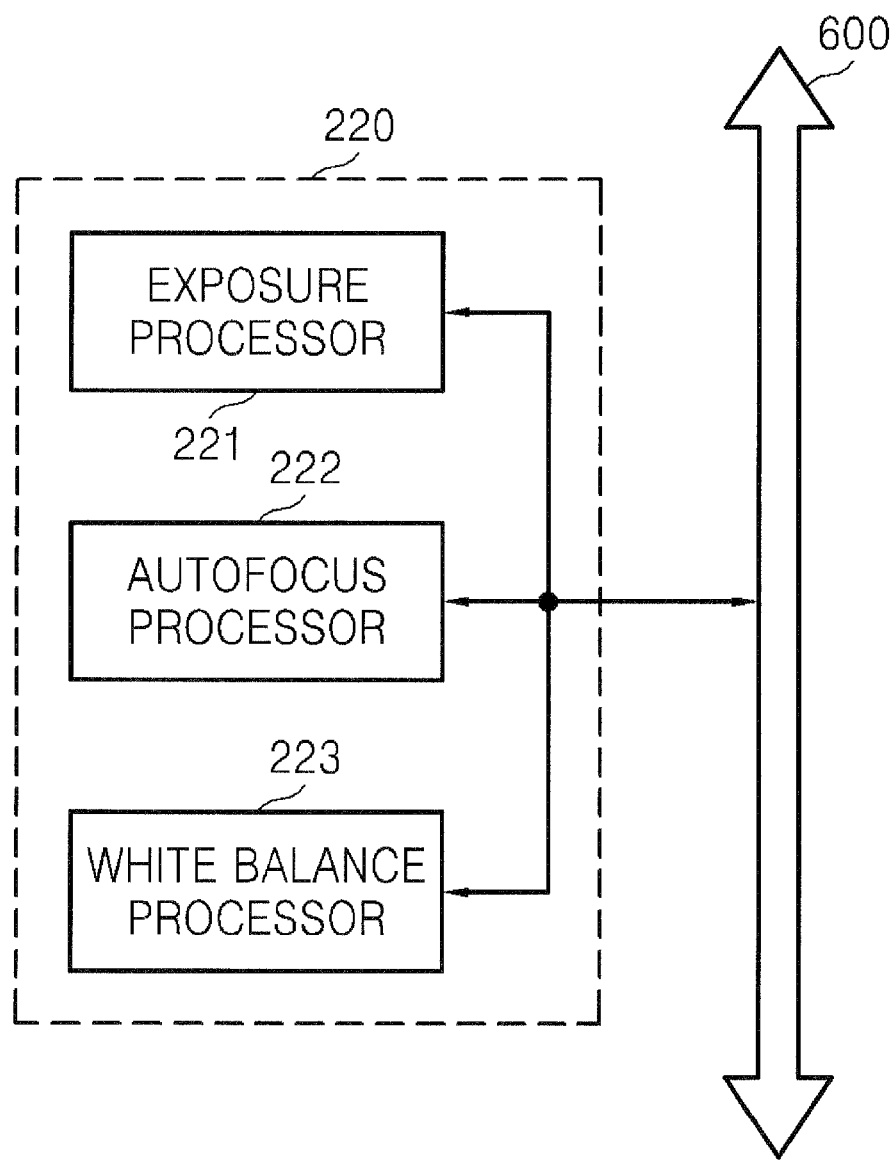
FIG. 3 is a detailed diagram showing an image signal processor (ISP) illustrated in FIG. 2.

FIG. 3 is a detailed diagram showing the ISP 220 illustrated in FIG. 2. Referring to FIG. 3, the ISP 220 includes an exposure processor 221, an autofocus processor 222, and a white balance processor 223.

The exposure processor 221 sets the exposure conditions of a camera using values obtained by adjusting an International Organization for Standardization (ISO), an iris, and a shutter. The autofocus processor 222 finds optimal contrast. The autofocus processor 222 sets autofocus using values obtained by adjusting an evaluation reference value of focusing, the movement and position of a lens according to magnification and a distance between a camera and a subject, zoom tracking of the lens according to a zoom operation, following of the movement of the subject, gain of an image signal according to a shutter speed, triggering of an auxiliary light source illuminating the subject, and tracking of the position of the lens. The white balance processor 223 processes the image data using a white balance gain coefficient.

Figure 4:
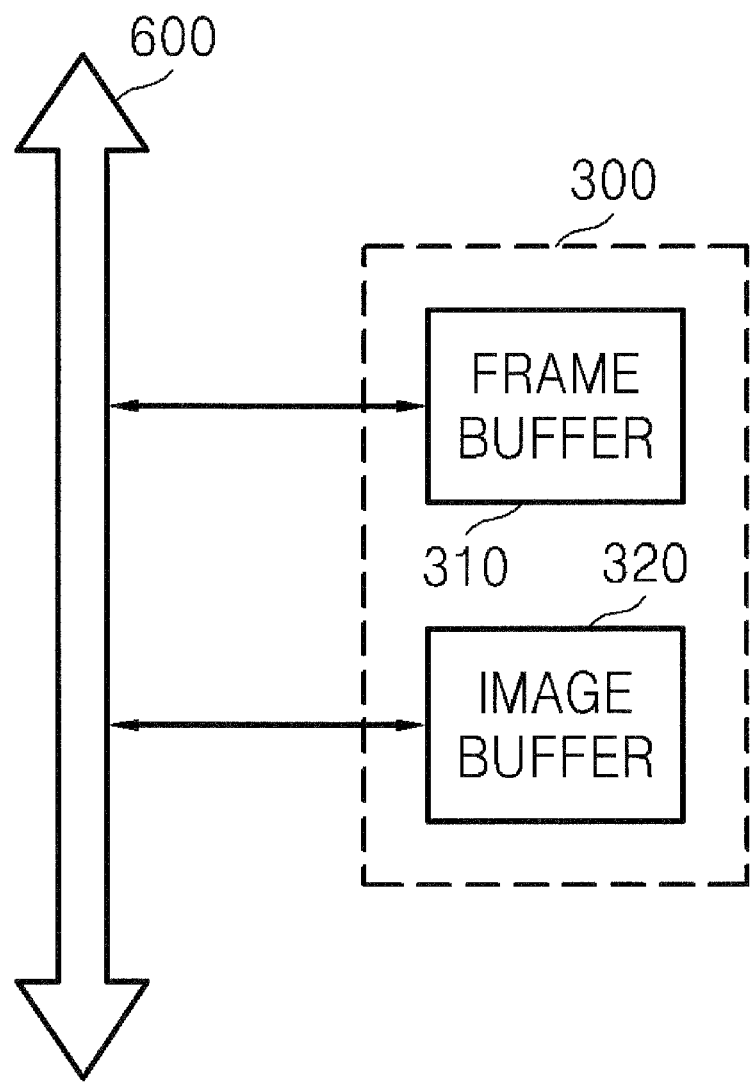
FIG. 4 is a detailed diagram showing a first memory unit illustrated in FIG. 1.

FIG. 4 is a detailed diagram showing the first memory unit 300 illustrated in FIG. 1. Referring to FIG. 4, the first memory unit 300 includes a frame buffer 310 and an image buffer 320.

The frame buffer 310 and the image buffer 320 may periodically receive via the system bus 600 and store image data converted by the format converter 250. For instance, the frame buffer 310 may store image data converted into an RGB format and the image buffer 320 may store image data converted into a YCbCr format. The frame buffer 310 and the image buffer 320 may be controlled by the controller 570 illustrated in FIG. 1 to simultaneously store the image data in the RGB format and the image data in the YCbCr format, respectively.

Figure 5:
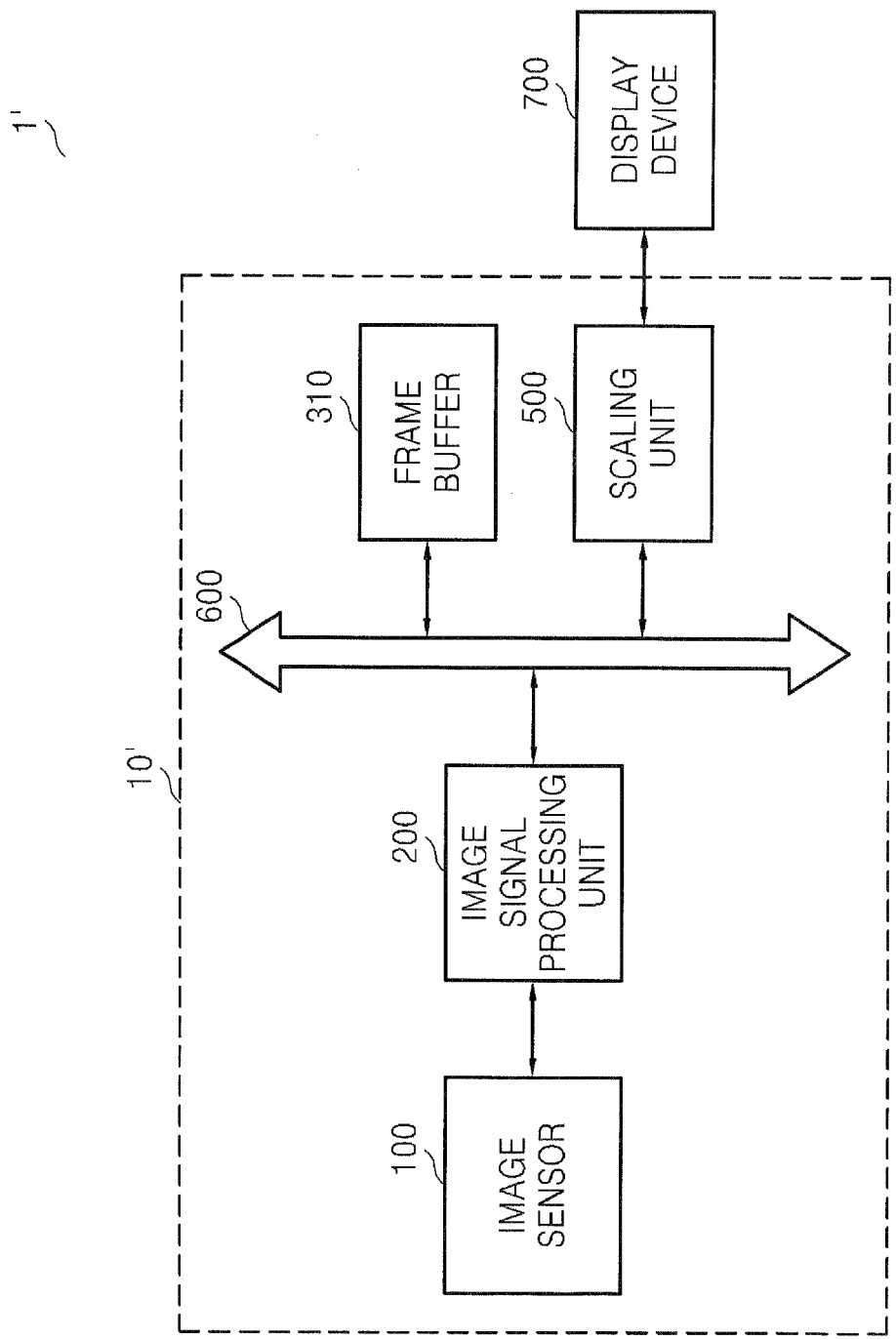
FIG. 5 is a diagram showing the operation of the camera module in a preview mode of a camera according to some embodiments of the present inventive concept.

FIG. 5 is a diagram showing the operation of a camera module 10' in a preview mode of a camera 1' according to some embodiments of the present inventive concept. Since the image sensor 100 and the image signal processing unit 200 have been described above, descriptions thereof will be omitted here.

Referring to FIG. 5, the frame buffer 310 receives image data converted into the RGB format by the image signal processing unit 200 via the system bus 600 and stores it. At this time, although not shown in FIG. 5, the image buffer 320 periodically receive and stores the image data converted into the YCbCr format by the image signal processing unit 200.

The scaling unit 500 receives the image data stored in the frame buffer 310 via the system bus 600 and scales it to be output to the display device 700. The scaling unit 500 may interface with the display device 700 through a first interface (not shown). The display device 700 may be a liquid crystal display (LCD) screen included in the camera 1' or an external TV or computer, but the present inventive concept is not restricted thereto. A user can check a preview image of the camera 1' through the display device 700.

Figure 6:
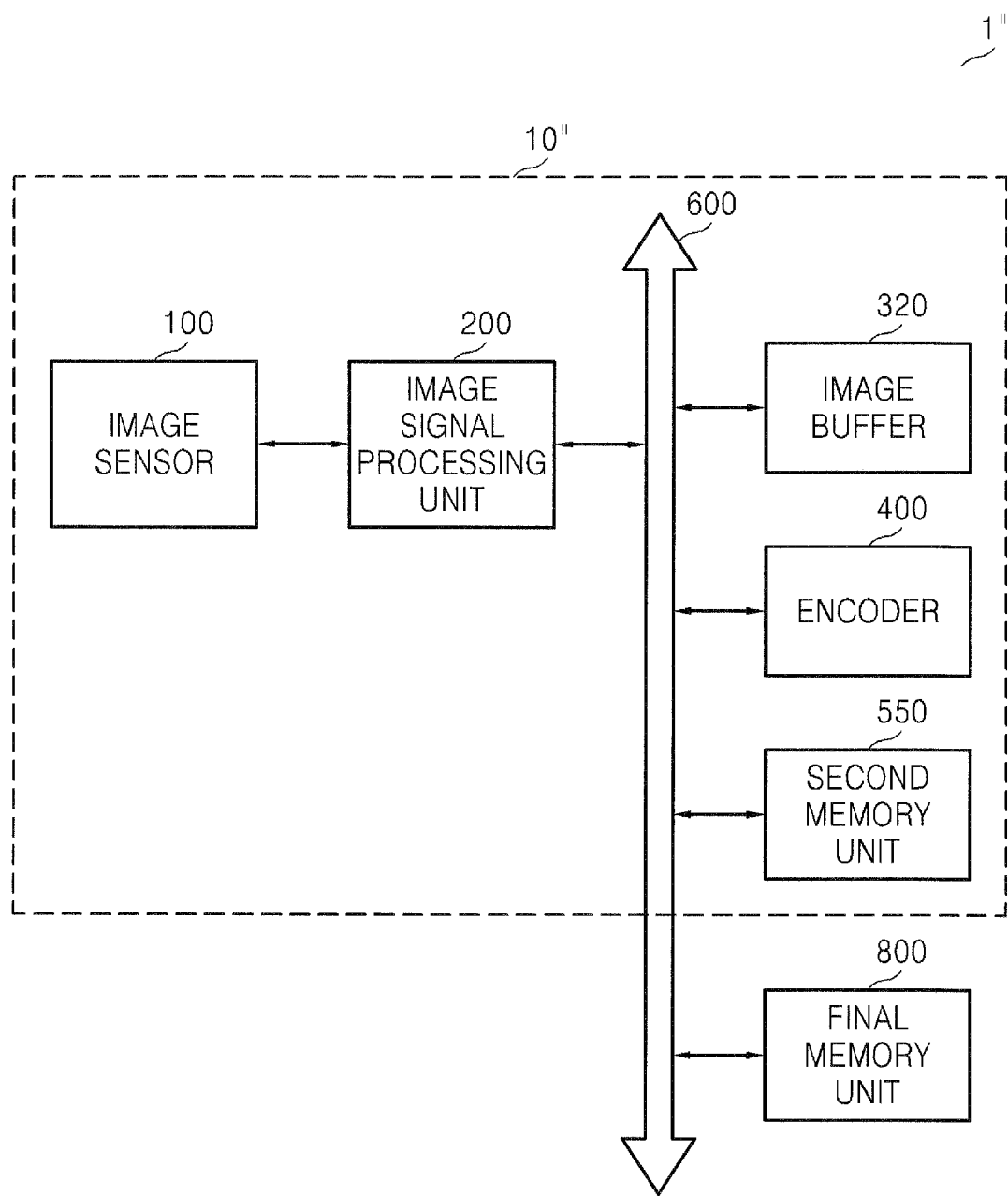
FIG. 6 is a diagram showing the operation of the camera module in a standard view of a camera according to some embodiments of the present inventive concept.

FIG. 6 is a diagram showing the operation of a camera module 10" in a standard view of a camera 1" according to some embodiments of the present inventive concept. Since the image sensor 100 and the image signal processing unit 200 have been described above, descriptions thereof will be omitted here.

Referring to FIG. 6, the image buffer 320 periodically receives and stores image data converted into the YCbCr format by the image signal processing unit 200 and outputs YCbCr format image data stored upon the opening of a shutter to the encoder 400. The encoder 400 receives and converts the YCbCr format image data into a JPEG file and outputs the JPEG file to the second memory unit 550. The second memory unit 550 receives and stores the JPEG file and transmits it to a separate final memory unit 800 (e.g., an external NAND flash memory) through a second interface (not shown).

FIG. 7 is a flowchart of a method of driving a camera including a camera module according to some embodiments of the present inventive concept. The method illustrated in FIG. 7 may be performed by the camera 1 including the camera module 10 illustrated in FIG. 1.

The camera 1 receives an image through a lens in operation S110. The image sensor 100 converts the image into an electrical image signal, i.e., full-size image data. The ISP 220 processes the image data received from the image sensor 100. The image calibrator 230 calibrates the image data through calibration of color shade, white balance, and shake compensation. The scaler 240 adjusts the size of the calibrated image data. The format converter 250 converts the image data into different formats in operation S120.

Thereafter, the first memory unit 300 periodically receives and stores the format-converted image data in operation S130. At this time the frame buffer 310 may store the image data in the RGB format and the image buffer 320 may store the image data in the YCbCr format.

Next, the controller 570 determines whether a shutter is open in operation S140. When it is determined that the shutter is open, the encoder 400 converts the image data in the YCbCr format into a JPEG file in operation S250. The second memory unit 550 stores the JPEG file in operation S260. The final memory unit (e.g., an external NAND flash memory) 800 stores the JPEG file in operation S270.

When it is determined that the shutter is not open, the scaling unit 500 adjusts the image data in the RGB format to a size for display in operation S150. The adjusted image data is displayed on the display device 700 in operation S160.

As described above, according to some embodiments of the present inventive concept, a full-size image is stored and is also scaled down to be used as a preview image in a preview mode and the stored full-size image is immediately used when a user presses down a shutter of a camera, so that the camera's shutter delay is reduced. As a result, users can quickly capture the images of scenes that they want to catch with cameras without missing them.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. A camera module comprising:
an image sensor configured to convert an optical signal received through a lens into an electrical signal and generate full-size image data;
an image signal processing unit configured to calibrate and output the full-size image data;
a first memory unit configured to periodically receive and store the full-size image data from the image signal processing unit via a system bus;
a scaling unit configured to scale down the full-size image data received from the first memory unit via the system bus and periodically output scaled-down image data to a display device via a local bus; and
an encoder configured to receive the full-size image data stored in the first memory unit via the system bus, convert it into a compressed file in a predetermined format, and output the compressed file upon opening of a shutter, wherein the full-size image data and the compressed file are transmitted through the same system bus, wherein the image signal processing unit comprises:
an image signal processor configured to set exposure conditions for the full-size image data, set autofocus, and/or adjust white balance;
an image calibrator configured to calibrate color shade and picture quality of the full-size image data; and
a format converter configured to convert a format of full-size image data output from the image calibrator into a predetermined format, and wherein the format converter converts the full-size image data output from the image calibrator into first format full-size image data corresponding to the display device and into second format full-size image data corresponding to the encoder.

2. The camera module of claim 1, further comprising a controller configured to control the first memory unit not to store the full-size image data upon the opening of the shutter.

3. The camera module of claim 1, further comprising a second memory unit configured to store the compressed file output from the encoder, 4. The camera module of claim 1, wherein the first memory unit comprises:
a first buffer configured to buffer the first format full-size image data to the display device; and
a second buffer configured to buffer the second format full-size image data to the encoder.

5. The camera module of claim 4, wherein the encoder converts the second format full-size image data output from the second buffer into the compressed file in the predetermined format and outputs the compressed file upon the opening of the shutter.

6. A camera comprising the camera module of claim 1.

7. A camera module comprising:
an image sensor configured to convert an optical signal received through a lens into an electrical signal and generate full-size image data;
an image signal processing unit configured to calibrate and output the full-size image data;
a first memory unit configured to periodically receive and store the full-size image data from the image signal processing unit via a system bus;
a scaling unit configured to scale down the full-size image data received from the first memory unit via the system bus and periodically output scaled-down image data to a display device via a local bus; and
an encoder configured to receive the full-size image stored in the first memory unit via the system bus; convert it into a compressed file in a predetermined format, and output the compressed file upon opening of a shutter, wherein the full-size image data and the compressed file are transmitted through the same system bus, wherein the image signal processing unit comprises:
an image signal processor configured to set exposure conditions for the full-size image data, set autofocus, and/or adjust white balance;
an image calibrator configured to calibrate color shade and picture quality of the full-size image data; and
a format converter configured to convert a format of full-size image data output from the image calibrator into a predetermined format, and wherein the format converter converts the full-size image data output from the image calibrator into RGB format full-size image data corresponding to the display device and into YCbCr format full-size image data corresponding to the encoder and outputs the RGB format full-size image data and the YCbCr format full-size image data to the first memory unit.

8. The camera module of claim 7, wherein the encoder converts the YCbCr format full-size image data output from the first memory unit into a Joint Photographic Experts Group (JPEG) file and outputs the JPEG file upon the opening of the shutter.

9. A method of driving a camera module, the method comprising the operations of:
converting an optical signal received through a lens into an electrical signal to generate full-size image data;
calibrating the full-size image data;
storing the calibrated full-size image data periodically via a system bus;
scaling down the stored full-size image data received via the system bus and outputting scaled-down image data to a display device periodically via a local bus; and
converting the stored full-size image data into a compressed file in a predetermined format and outputting the compressed file upon opening of a shutter via the system bus, wherein the full-size image data and the compressed file are transmitted through the same system bus, wherein the operation of calibrating the full-size image data comprises converting a format of the full-size image data into a predetermined format, and wherein converting the format of the full-size image data comprises converting the full-size image data into a first format corresponding to the display device and into a second format corresponding to an encoder.

10. The method of claim 9, further comprising controlling the full-size image data not to be stored upon the opening of the shutter.

11. The method of claim 9, further comprising storing the compressed file.

12. The method of claim 9, wherein the operation of calibrating the full-size image data comprises calibrating color shade and picture quality of the full-size image data.

13. The method of claim 9, wherein the operation of periodically storing the calibrated full-size image data comprises:
    buffering the full-size image data in the first format to the display device; and
    buffering the full-size image data in the second format to the encoder.

14. The method of claim 9, wherein the first format is an ROB format and the second format is a YCbCr format.

15. The method of claim 14, wherein the operation of converting the stored full-size image data into the compressed file and outputting the compressed file upon the opening of the shutter comprises converting the full-size image data in the YCbCr format into a Joint Photographic Experts Group (JPEG) file and outputting the JPEG file upon the opening of the shutter.

* * * * *